United States Patent [19]

Browder

[11] 4,028,729
[45] June 7, 1977

[54] PROVISION AND DISPLAY OF VIDEO SIGNALS
[75] Inventor: Lewis B. Browder, Altadena, Calif.
[73] Assignee: Bell & Howell Company, Chicago, Ill.
[22] Filed: Mar. 25, 1975
[21] Appl. No.: 561,958
[52] U.S. Cl. .............................. 358/148; 358/127
[51] Int. Cl.² ................... H04N 5/04; H04N 5/785
[58] Field of Search ............ 178/69.5 TV, 6.6 TC, 178/69.5 DC, 69.5 R; 360/36; 358/8

[56] References Cited
UNITED STATES PATENTS

| | | | |
|---|---|---|---|
| 3,639,689 | 2/1972 | Dol | 360/36 |
| 3,629,491 | 12/1971 | Dann | 360/36 X |
| 3,668,309 | 6/1972 | Arimura | 358/8 |
| 3,676,583 | 7/1972 | Morita et al. | 360/36 |
| 3,681,522 | 8/1972 | Tanabe | 178/69.50 C X |

*Primary Examiner*—Howard W. Britton
*Assistant Examiner*—Mitchell Saffian
*Attorney, Agent, or Firm*—Benoit Law Corporation

[57] ABSTRACT

Apparatus for providing visible video information has equipment for providing electrical video information including picture signals and picture synchronizing signals affected by flutter, and equipment for processing synchronizing signals. This processing equipment effects a stabilization of synchronizing signals against at least part of the mentioned flutter. Equipment is connected to the video information providing equipment and to the synchronizing signal processing equipment for displaying video information contained in the picture signals. This displaying equipment effects synchronization of the video information with the processed synchronizing signals. Equipment is connected between a video information providing equipment and the synchronizing signal processing equipment for compensating the stabilizing function of the mentioned stabilization, whereby the displayed video information is synchronized with synchronizing signals affected by essentially the same flutter as the picture signals.

A method of improving the display of video information contained in video signals affected by flutter and synchronized by synchronizing signals subjected to processing by means for stabilizing synchronizing signals against at least part of the flutter, compensates the stabilizing function to preserve flutter in the synchronizing signals, and synchronizes the video signals for the display of video informaton by synchronizing signals affected by essentially the same flutter as the picture signals.

39 Claims, 8 Drawing Figures

PROVISION AND DISPLAY OF VIDEO SIGNALS

BACKGROUND OF THE INVENTION

1. Field of the Invention

The subject invention applies to the provision and display of video information and has particular application to apparatus for displaying recorded video programs, although not being limited thereto.

2. Description of the Prior Art

The detrimental effect of flutter on the display of video signals is well known, as is the fact that video signals is well known, as is the fact that video information recording and playback equipment is a typical, although by no means exclusive, source of flutter.

The thrust of prior-art endeavor has been to improve the equipment responsible for the flutter. For instance, design and precision of video recording and playback system, including video tape recorders, have been continuously improved toward a reduction of flutter to tolerable proportions. This has neither been consistently successful nor has it helped in realistically bringing the equipment in question within the reach of the public or of educational and other institutions on a large scale. Rather, the requisite improvements for an implementation of prior-art proposals in this area have greatly increased the complexity and expense of manufacture and design of the apparatus in question.

An aggrevating factor in this area has been the tendency of conventional television display sets to amplify the effect of flutter in received signals. The source of this problem has been traced to a phase lock loop or electronic flywheel circuit present in most sets for stabilizing synchronizing signals against noise above a certain frequency. In general, prior-art stabilization circuits of this type have the advantage of permitting the synchronization drive to adjust to synchronization frequency differences when switching stations or to drift occurring in any station, while at the same time rendering the synchronization drive relatively immune to frequently occurring noise disturbances.

However, it will now be shown that these otherwise beneficial stabilization circuits amplify the effect of flutter in certain instances. Ideally, the horizontal position of a picture element in a video display is related to the phasing of the corresponding horizontal sync pulse. In practice, this is no longer the case if the horizontal sync has been stabilized by the stabilizing circuit of the set to a relatively steady time averaged value.

For instance, the line rate as delivered by a video tape recorder in the playback mode will have a flutter component. If $\nu_o$ is the nominal horizontal sync frequency and A is the peak amplitude of a flutter component of frequency , then the delivered line rate $\nu$ will be $$\nu = \nu_o [1+A \sin 2\pi\psi t] \quad (1)$$

The horizontal position of a picture element ideally will be at some fixed phase with respect to the beginning of the particular line. If $\phi_h$ is the absolute phasing of the line beginning, we have $$\nu = \frac{1}{2\pi} \frac{d\phi_h}{dt} \quad (2)$$

so that $\phi_h$ is $$\phi_h = 2\pi \int \nu_o [1+A \sin 2\pi\psi t] dt \quad (3)$$

Since we are interested in the excursion of the variational component due to flutter and the peak amplitude of the excursion, the integral is taken between $$t = 0 \text{ and } t = 1/4\psi \quad (4)$$

variational component is $$\phi_h = 2\pi\nu_o A \int_0^{\frac{1}{4\psi}} (\sin 2\pi\psi t) \, dt \quad (5)$$

or $$\phi_h = \nu_o A/\psi \quad (6)$$

as the amplitude excursion of the screen element when the sync is stabilized in the television display set.

Since the horizontal sweep is linear with time, this excursion expressed as a fraction of screen width is $$\Gamma = \frac{\phi_h}{2\pi} = \frac{\nu_o A}{2\pi\psi} \quad (7)$$

wherein $\Gamma$ is the peak amplitude of the excursion of a picture element and A is the peak amplitude of the flutter component whose frequency is $\psi$.

As to the effect of flutter on the image display, we are concerned with the ratio $$\frac{\Gamma}{A} = \frac{\nu_o}{2\pi\psi} \quad (8)$$

For a nominal horizontal sync frequency of $\nu_o = 15,750$ Hz and a flutter component frequency of $\psi = 100$ Hz, we obtain a ratio $\Gamma/A$ of $$\frac{\Gamma}{A} = \frac{15\,750}{2\pi\,10^2} \approx 25 \quad (9)$$

Video recording and playback machines in which all flutter components remain below 0.1% or $A \leq 0.001$ are expensive and complex. But even at that low value, the effects of flutter due to the above mentioned stabilizing action is still very objectionable.

For instance, if we take the above example of equation (9), we find that the picture element would execute excursions with an amplitude of $$25 \cdot 10^{-3} = 0.025 \quad (10)$$

as a fraction of screen width.

For a screen width of about 20 inches (508 millimeters), for instance, the excursion amplitude of picture elements would be about 0.5 inches (12.7 millimeters) of 1 inch (25.4 millimeters) peak-to-peak.

Such a deviation is intolerable on its face. To reduce such excursions to, say, 0.04 inches or about one millimeter under the permises of our above example, it would be necessary to reduce the flutter of the video recording and playback machine to about $4 \cdot 10^{-5}$ or 0.004%!

The general equation applying to these cases is $$A = \frac{\Omega 10^2 \pi}{\nu_o \lambda} \quad (11)$$

wherein:

A is the peak amplitude of flutter;

Ω is the peak-to-peak excursion of the picture element on the display screen;

$v_o$ is the nominal horizontal sync frequency; and

λ is the screen width.

The resulting precision requirements are far too stringent in most practical applications.

In their quest for a workable solution, proposals have been made which necessitate an invasion and modification of the existing circuitry of the television display set. With respect to such proposals, most experts in the field agree that systems which are inherently incapable of operation without invasion and modification of the existing receiver circuitry have practically no chance of widespread acceptance among television receiver owners.

SUMMARY OF THE INVENTION

While I do not wish to be bound by any theory herein expressed, it is a general object of this invention to overcome any one or more of the above mentioned disadvantages.

In particular, it is an object of this invention to provide improved apparatus for providing visible video information.

It is a further object of this invention to provide improved apparatus for providing electrical video signals for video display apparatus in which synchronization signal flutter is stabilized.

It is a related object of this invention to provide apparatus and methods for overcoming the stabilization tendency of conventional television receiver sets in connection with synchronization signal flutter.

It is a further object of this invention to provide methods of improving the display of video information where a stabilization of synchronization signal flutter exists.

It is a further object of this invention to provide improved apparatus for enhancing flutter in an electrical signal which is affected by flutter.

It is a related object of this invention to provide composite video signals in which flutter of the synchronization signal is enhanced relative to flutter of the picture signal.

Other objects will become apparent in the futher course of this disclosure.

From a first aspect thereof, this invention resides in apparatus for providing visible video information and, more specifically, resides in the improvement comprising, in combination, means for providing electrical video information including picture signals and picture synchronizing signals affected by flutter, means for processing the synchronizing signals, these processing means including means for stabilizing synchronizing signals against at least part of the flutter, the stabilizing means including filter means for attenuating signals having flutter frequencies above a predetermined frequency, means connected to the video information providing means and to the synchronizing signal processing means for displaying video information contained in the picture signals, these display means, including means for synchronizing the video information with the processed synchronizing signals, and means connected between the video information providing means and the synchronizing signal processing means for compensating the stabilizing function of the stabilizing means, the compensating means including means for enhancing the flutter amplitude of synchronizing signals having said flutter frequencies substantially inversely proportional to the attenuation, and means for applying the synchronizing signals with the enhanced flutter amplitude to the processing means, whereby the synchronizing means in the display means synchronize the video information with synchronizing signals affected by essentially the same flutter as the picture signals.

In accordance with a preferred embodiment of the subject invention, the compensating means include means for enhancing flutter as to the synchronizing signals process by the processing means for applying the synchronizing signals with enhanced flutter to the processing means. In accordance with a further preferred embodiment of this invention, the stabilizing means in the processing means include filter means for attenuating signals having flutter frequencies above a predetermined frequency, and the compensating means including means for enhancing the flutter amplitude of synchronizing signals having the flutter frequencies substantially inversely proportional to the attenuation, and means for applying the synchronizing signals with the enhanced flutter amplitude to the processing means.

From another aspect thereof, the subject invention resides in apparatus for providing electrical video signals including picture signals and picture synchronizing signals for video display apparatus having input means for receiving a composite video signal including picture signals and picture synchronizing signals, means for stabilizing received synchronizing signals at least partially against flutter, and means for synchronizing a display of received picture signals with received synchronizing signals. The invention according to this aspect resides, more specifically, in the improvement comprising, in combination, means for providing electrical video information including picture signals and picture synchronizing signals affected by flutter, means connected to the video information providing means for separating the picture signals and synchronizing signals from each other, means for processing the synchronizing signals including means for essentially deactivating the stabilizing function of the synchronizing signal stabilizing means in the video display apparatus, means connected to the separating means and to the processing means for providing a composite video signal including the picture signals and the processed synchronized signals, and means connected between the composite video signal providing means and the input means for applying the provided composite video signal to the input means of the video display apparatus.

From another aspect thereof, this invention resides in apparatus for enhancing flutter in an electrical signal affected by flutter, and residues more, specifically, in the improvement comprising, in combination, phase lock loop means having input means for receiving the flutter-affected signal, loop filter means, and output means for extracting ahead of the loop filter means an error signal in response to the flutter affecting said signal, and means connected to the output means for providing in response to the error signal enhanced flutter in said electrical signal.

In a preferred embodiment of the subject invention, the enhanced flutter providing means include variable delay means for receiving the flutter-affected signal, and means for controlling the variable delay means in response to the error signal.

From another aspect thereof, this invention resides in apparatus for enhancing flutter in an electrical signal affected by flutter, and resides, more specifically, in the improvement comprising, in combination, first phase lock loop means having input means for receiving the flutter affected signal, first loop filter means, and output means, second phase lock loop means having input means connected to the output means of the first phase lock loop means, second loop filtered means, and output means, means connected between the first and second phase lock loop means for deriving an error signal from the first phase lock loop means ahead of the first loop filter means and applying the derived error signal to the second phase lock loop means after the second loop filter means, and means for deriving an output signal with enhanced flutter from the output means of the second phase lock loop means.

From another aspect thereof, this invention resides in a method of improviding the display of video information contained in picture signals affected by flutter and synchronized by synchronizing signals subject to processing by means for stabilizing synchronizing signals against at least part of the flutter. The invention according to this aspect resides, more specifically, in the improvement comprising the steps of compensating the stabilizing function to preserve flutter in the synchronizing signals, and synchronizing the video signals for the display of video information by synchronizing signals affected by essentially the same flutter as the picture signals.

In this aspect of the invention, of synchronizing signals includes attenuation of signals having flutter frequencies above a predetermined frequency, and the compensation of the stabilizing function includes the step of enhancing the flutter amplitude of the synchronizing signals having the mentioned flutter frequencies substantially inversely proportional to the attenuation.

From yet another aspect thereof, the subject invention resides in apparatus for providing electrical video signals including picture signals and picture synchronizing signals for video display apparatus having input means for receiving a composite video signal including picture signals and picture synchronizing signals, means for stabilizing receive synchronizing signals at least partially against flutter, and means for synchronizing a display of receive picture signals with receive synchronizing signals. The invention according to this aspect resides, more specifically, in the improvement comprising in combination, means for providing electrical video information including picture signals and picture synchronizing affected by flutter, means connected to said video information providing means for separating said picture signals and synchronizing signals from each other, means for processing said synchronizing signals including means for essentially deactivating the stabilizing function of said synchronizing signal stabilizing means in said video display apparatus and for shifting the phase of at least part of said flutter affected picture synchronizing signals by $2\pi n$ wherein $n$ is a positive integer greater than zero, means connected to said separating means and to said processing means for providing a composite video signal including said picture signals and said processed synchronizing signals, and means connected between said composite video signal providing means and said input means for applying said provided composite video signal to said input means of said video display apparatus.

From still another aspect thereof, the subject invention resides in apparatus for providing electrical video signals including picture signals and picture synchronizing signals for video display apparatus having input means for receiving a composite video signal including picture signals and picture synchronizing signals, means for stabilizing received synchronizing signals at least partially against flutter, and means for synchronizing a display of received picture signals with display synchronization signals in response to received picture synchronizing signals. The invention according to this aspect resides, more specifically, in the improvement comprising, in combination, means coupled to said display synchronizing means for providing signals corresponding to said display synchronization signals, means for providing electrical video information including picture signals and picture synchronizing signals affected by flutter, means connected to said video information providing means for separating said picture signals and synchronizing signals from each other, means connected to said separating means and to said corresponding signal providing means for providing error signals in response to said separated synchronizing signals and said corresponding signals, means for processing said separated synchronizing signals with said error signals for essentially deactivating the stabilizing function of said synchronizing signal stabilizing means in said video display apparatus, means connected to said separating means and to said processing means for providing a composite video signal including said picture signals and said processed synchronizing signals, and means connected between said composite video signal providing means and said input means for applying said provided composite video signal to said input means of said video display apparatus.

BRIEF DESCRIPTION OF THE DRAWINGS

The invention will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
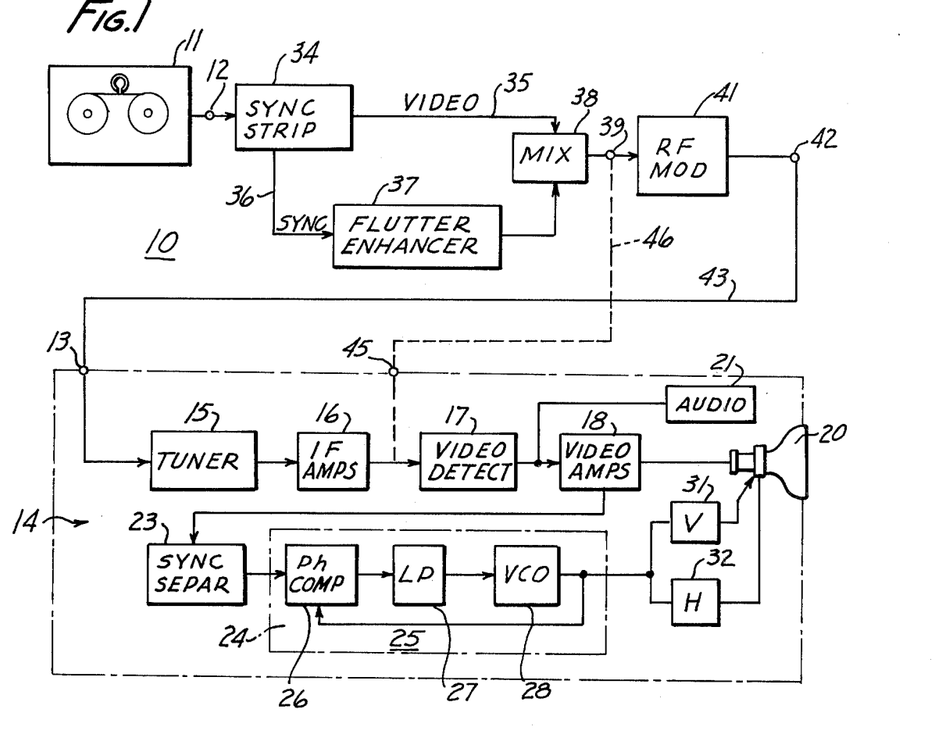
FIG. 1 is a block diagram of a video display system according to the subject invention, including conventional video tape recorder and television receiver equipment.

The video display system 10 of FIG. 1 includes a conventional video tape recording and playback machine 11 which constitute a means for providing electrical video information including picture signals and picture synchronization signals affected by flutter. The machine 11 may be of the linear, slant track or transverse scan type. Other types of video recording and playback systems may be employed, such as video disc or video film systems. Alternatively, the machine 11 may be thought symbolic for any other source of electrical video information or any video signal transmission link that provides flutter-affected video signals.

The flutter-affected picture signals and picture synchronization signals provided by the machine 11 appear at a terminal 12 in the form of a composite video signal. Some conventional video recording and playback machines are provided with equipment (not shown) for modulating played-back video signals on a carrier so as to permit direct application of the played-back video information to antenna terminals 13 of a conventional television receiver set 14. For the purpose of comparison, the latter possibility will now be analyzed.

The set 14 has a tuner 15 adjustable to the appropriate carrier frequency of the received television signal. The latter typically includes an amplitude-modulated video signal and a frequency-modulated audio signal. The video signal, in turn, includes a picture signal and a picture synchronizing or synchronization signal.

The tuner 15, which includes a radio frequency amplifier, an oscillator and a mixer, is followed by intermediate frequency amplifiers 16. The amplified intermediate frequency television signal is applied to a video detector 17. The detected video signal is applied to video amplifiers 18. The audio signal is either taken off after the video detector or after the first video amplifier. After video amplification, the picture signals and synchronization signals are applied to the input of a picture tube 20. The picture signals are thereby employed to vary the intensity of the electron beam in the picture tube in accordance with the video information, and the synchronizing signals, horizontal and vertical, are employed to cut off the electron beam in the picture tube during retrace period when no picture information is being transmitted. A conventional audio system 21 reproduced the sound information which accompanies the video signals.

A sync separator 23 derives the synchronization information, including vertical and horizontal synchronizing signals, from the video detector 17 or video amplifier 18. These synchronizing signals are processed before they are employed to synchronize the video display. In particular, conventional television sets have a means 24 for stabilizing synchronizing signals against at least part of the flutter contained therein. These means in effect filter the sync information in time and are sometimes called "electronic flywheel stabilizers."

The sync stabilizer 24 has a phase lock loop 25 including a phase comparator or detector 26, a loop filter 27, and a voltage controlled oscillator 28. The sync separator 23 applies the sync signals to one input of a phase comparator 26, whose other input is connected to the output of the voltage controlled oscillator 28.

Figure 2:
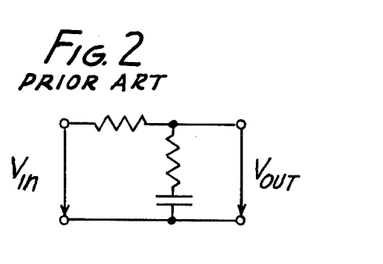
FIGS. 2 and 3 are schematics of loop filters that are typically employed in synchronization stabilizing circuits of conventional television receiver equipment of the type shown in FIG. 1.
Figure 3:
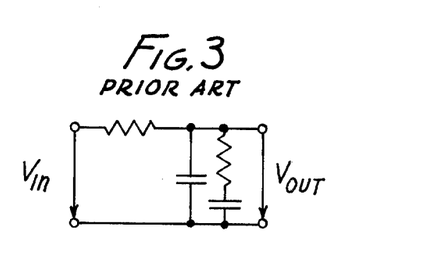

The phase difference or error signal is applied to the loop filter 27 which typically is a low pass filter composed of resistive and capacitive components as shown in FIG. 2 or 3.

Figure 4:
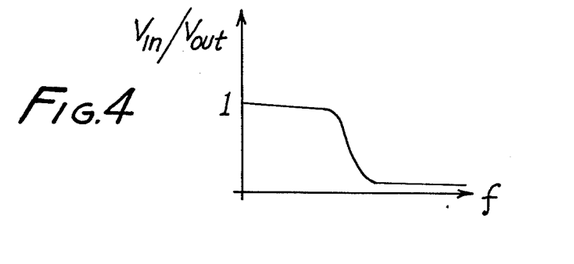
FIG. 4 is a plot showing an attenuation characteristic of loop filters of the latter type.

In FIG. 4, the output voltage-input voltage ratio or attenuation of the loop filter 27 is plotted against the frequency of the phase difference or error signal applied to the loop filter 27. True to the properties of a low pass filter, the loop filter 27 imposes at best a small attenuation on signals having a frequency below the cutoff illustrated in FIG. 4 by the sharp decline in the depicted curve. This means that the set 14 is not stabilized against low-frequency flutter, but rather will adapt itself to slow frequency drifts and noise disturbances of reasonably short duration.

More specifically, low-frequency deviations in the error signal will reach the input of the voltage controlled oscillator 28 by way of the loop filter 27, thereby causing the oscillator 28 to adjust the phase of its output signal accordingly. This output signal, in turn, is applied to the second input of the phase comparator, whereby the loop 25 will lock in on the changed sync signal frequency.

On the other hand, the loop filter 27 imposes high attenuation on signals having a frequency above the cutoff frequency of the filter. Practically occurring cutoff frequencies are on the order of some 10 to 20 Hz depending on the make of the set 14.

The degree of attenuation typically increases with the signal frequency and also depends on the make of the set. For instance, typical television sets would attenuate the flutter component of synchronizing signals by a factor of ten at frequencies of about 50 Hz and by a factor of more than 100 in the 1 kHz range. Some recently manufactured television sets have relatively reduced time constants in their flywheel circuitry. However, even these sets still impose considerable attenuation on the flutter component of synchronizing signals at higher frequencies. For instance, one such set imposes an attenuation by a factor of 4.3 at 50 Hz, 6 at 100 Hz and 8.7 at 400 Hz.

In practice, this means that flutter components with frequencies above about 20 Hz cannot effectively reach the input of the voltage controlled oscillator. Accordingly, the output of the voltage controlled oscillator 28 remains immune to such flutter frequencies and the synchronizing portion of the set 14 is accordingly stabilized by the means 24.

The output signal of the voltage controlled oscillator 28 is applied to the vertical and horizontal sweep circuits 31 and 32 of the set which handle the requisite deflection of the electron beam or beam in the display tube 20 in a conventional manner. As has been shown above, the stabilizing function of the phase lock loop 25 has devastating consequences as far as the stability of the image displayed by the video tube 20 is concerned. Elimination of the phase lock loop 25 would be no practical solution, since that would render the set 14 incapable of handling typical broadcast receptions. The provision of a selective bypass of the loop 25 which would be actuated when the set 14 is used to display played-back video signals does also not offer a practical solution, since invasions and modifications of the circuitry or existing sets are generally shunned, since experience has shown that people on a large scale will not purchase equipment, such as video tape recorders, video cameras and the like, if they can only use such equipment after a modification of their existing television set. There also is a question whether an equipment manufacturer could economically provide a servicing force that would effect the necessary modifications in a reliable manner on a nation-wide or perhaps worldwide scale. Moreover, a mere bypassing of the phase lock loop 25 tends to upset the function of other circuits of the set.

In accordance with the subject invention, the stabilizing function of the loop 25 is compensated to preserve flutter in the synchronizing signals, typically without any invasion of the circuity of the television set. Of course, there may be embodiments within the spirit and scope of the subject invention that affect some circuit invasion. However, the point of the subject invention is that an invasion of the set circuitry can be avoided whenever desired.

In accordance with the illustrated preferred embodiments, the stabilizing function of the loop 25 is compensated by enhancing the flutter in the synchronizing signal ahead of the synchronizing signal processing in the set. For instance, FIG. 1 shows a preferred embodiment according to the subject invention in which the composite video signal received from the playback machine 11 at the terminal 12 is separated into a video or picture signal component and a synchronizing signal component.

More specifically, conventional sync stripper and separator circuitry 34 applies the picture signals to a line 35 and the synchronizing signals to a line 36. A flutter enhancer 37 enhances the flutter of only the synchronizing signals. A mixer 38 recombines the picture signals and synchronizing signals to provide at a terminal 39 a new composite video signal in which the flutter of the synchronizing signals is enhanced relative to the flutter of the picture signals.

A modulator 41 modulates the new composite video signal on a carrier so that the output terminal 42 of the playback machine with sync flutter enhancer system can be directly connected by a cable 43 to the antenna terminals 13 of the television set 14.

If no modulator 41 were provided or desired, the mixer output 39 could be directly connected to a special input 45 of the set 14 as indicated by a dotted line 46. That special input 45 is connected to the video detector 17 as shown. There are commercially available television monitor sets which have such a special input for video signals which are not modulated on a radio frequency carrier. Also, the special input 45 could be provided in existing sets with only a minor invasion into the circuitry.

In accordance with a preferred embodiment of the subject invention, the flutter enhancer 37 enhances the flutter amplitude of the synchronizing signals having flutter frequencies above the cutoff point of the loop filter 27 substantially inversely proportional to the effective attenuation of that loop filter. In this manner, the attenuation by the loop filter 27 is in effect nullified or, in other words, the loop filter 27 is electronically eliminated on a selective basis. In consequence, the output of the voltage controlled oscillator 28 follows the amplitude of flutter components in the sync signal, even at frequencies which are above the cutoff of the loop filter 27.

If we designate the attenuation of the loop filter 27 by T and the peak amplitude of a flutter component in the composite video signal provided by the machine 11 by A, the peak amplitude $\Xi$ of the corresponding enhanced flutter component becomes:

$$\Xi = AT \qquad (12)$$

This peak amplitude is, of course, in the synchronizing signal component of the composite video signal, whose picture signal component then only has a peak amplitude of the corresponding flutter component of A.

The attenuation of the loop filter 27 in the set 14 reduces the peak amplitude of the flutter component in the synchronizing signal to $$AT/T = A \qquad (13)$$

whereby the peak amplitude of the flutter component in the synchronizing signals applied to the deflection equipment of the display tube 20 is identical to the peak amplitude of the corresponding flutter components of the picture signals applied to the tube 20, or $$A_{sync} \equiv A_{pix} \qquad (14)$$

Considering the complexities of the circuitry and function of television receiving sets, it is not obvious that the latter measures would, in fact, eliminate or substantially reduce flutter in the displayed pictures. However, extensive prototype work and practical tests have shown that the methods and apparatus of the subject invention do in fact eliminate or substantially reduce the effects of flutter on the displayed pictures.

The subject invention also provides apparatus for enhancing flutter in an electrical signal affected by flutter. These apparatus may be used as flutter enhancers in the video display or video signal providing equipment of the subject invention. On the other hand, the utility of these apparatus is not intended to be limited to the video field.

Figure 5:
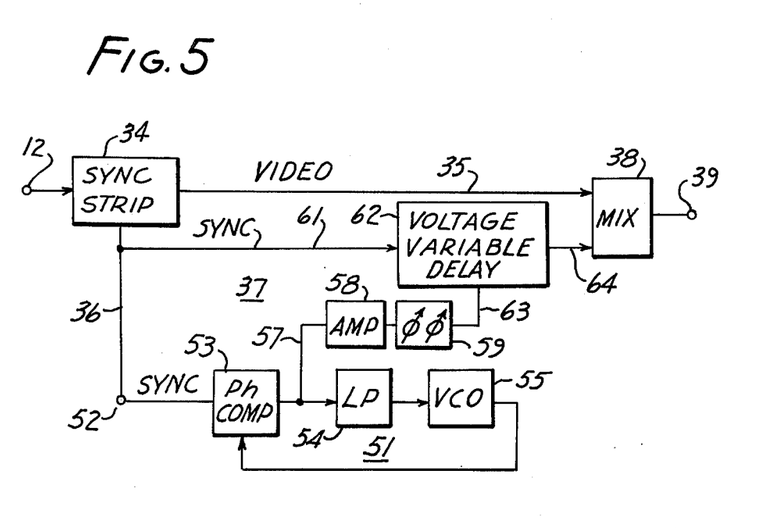
FIG. 5 is a block diagram of a synchronization signal flutter enhancer in accordance with a preferred embodiment of the subject invention, that may be employed in the system of FIG. 1.

In FIG. 5, apparatus of the latter type and designed for the video display system of FIG. 1 are illustrated.

More specifically, the flutter enhancer 37 in the apparatus of FIG. 5 has a phase lock loop 51 which, it will be noted, is basically similar to the phase lock loop 25 of the stabilizer 24 of the television set 14 shown in FIG. 1. As before, the composite video signal received at the terminal 12 is separated into picture signals applied to the mixer 38 by way of a lead 35, and sync signals applied to a lead 36.

The phase lock loop 51 has an input terminal 52 for receiving the flutter-affected synchronizing signals. These are applied to one input of a phase comparator 53. A loop filter 54 receives the phase difference or error signal provided by the phase comparator 53. The output of the loop filter 54 is applied to the input of the voltage controlled oscillator 55, whose output signal, in turn, is applied to the second input of the phase comparator 53. The loop 51 locks in on the synchronizing signal and follows variations thereof below the cutoff of the loop filter 54. This loop filter 54 typically is a low pass filter having an attenuation characteristic of the type shown in FIG. 4. Accordingly, the voltage controlled oscillator 55 will not follow flutter signal excursions above the cutoff frequency of the filter.

In consequence, the output of the phase comparator 53 will have a relatively large error signal in response to flutter components of frequencies above the cutoff frequency of the loop filter. This error signal is derived by a lead 57 from the loop 51 ahead of the filter 54.

The lead 57 in effect is connected to the output of the phase comparator 53.

An amplifier 58 is connected to the lead 57 to amplify the derived error signal. Conventional equipment 59 for adjusting the amplifier gain control and flutter frequency roll off permits adjustment of the flutter enhancing system to the characteristics of the phase lock loop 25 in the television set 14. The gain control typically includes a potentiometer (not shown), while the flutter frequency roll off equipment may include a switchable bank of capacitors (not shown).

A lead 61 is connected to the lead 36 and applies the synchronization signals also to a voltage variable delay line 62. Voltage variable delay lines are well known and commercially available. They typically include low pass filters with variable cutoff brought about by a variable solid state capacitor, such as a voltage variable capacitance diode. The amplified and adjusted error signal is applied to the voltage variable delay 62 by a lead 63 so as to control the delay line 62 in response to the amplified error signal. As a result, synchronizing signals with enhanced flutter appear at an output line 64 of the variable delay line 62. The mixer 38 again produces at a terminal 39 a composite video signal including picture signals and synchronization signals, with the flutter in the synchronization signals being enhanced relative to the flutter in the picture signals.

This modified composite video signal may then be modulated on a carrier and applied to the antenna terminals of the television set 14, or may be applied to the television set through the special input 45 without modulation as discussed above.

The design of the flutter enhancer shown in FIG. 5 makes it readily possible to enhance the flutter amplitude inversely proportional to the attenuation of the filter 27 in the set 14 at frequencies above the cutoff frequency. No such enhancement of the flutter takes place at flutter frequencies below the cutoff of the loop filter 54.

Figure 6:
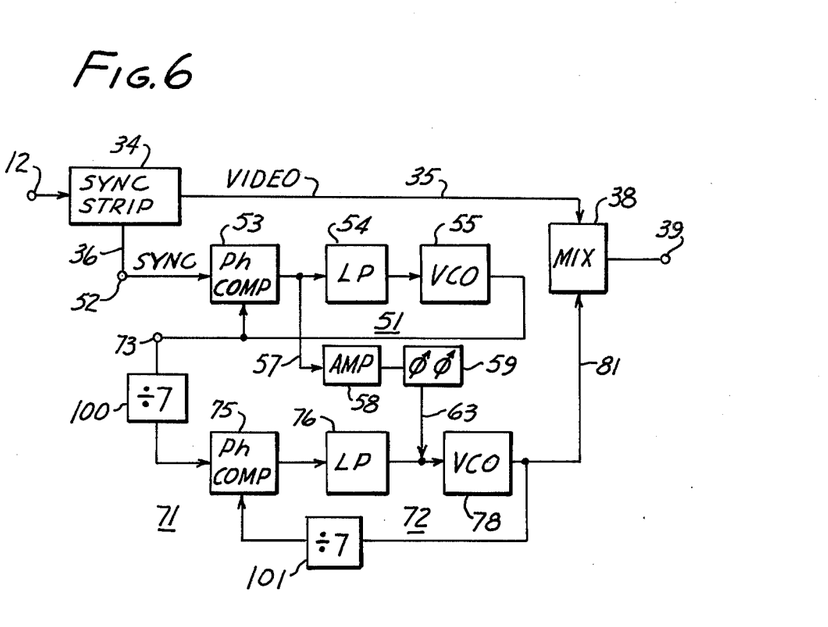
FIG. 6 is a block diagram of a synchronization signal flutter enhancer in accordance with a further preferred embodiment of the subject invention, that may be employed in the system of FIG. 1.

A further flutter enhancing apparatus 71 in accordance with another aspect of the subject invention is shown in FIG. 6. The apparatus of FIG. 6 employs the same phase lock loop 51 as the apparatus of FIG. 5. In addition, the apparatus of FIG. 6 employs a further phase lock loop 72 which has an input 73 connected to the output of the phase lock loop 51.

The phase lock loop 72 has a comparator 75, an input of which is connected to the input terminal 73 or, in other words, to the output of the voltage controlled oscillator 55 or phase lock loop 51. The output of the phase comparator 75 is connected to a loop filter 76 which may be identical or similar in design and characteristics to the loop filter 27 or 54. The output of the loop filter 76 is connected to the input of a voltage controlled oscillator 78, whose output, in turn, is connected to the second input of the phase comparator 75.

A lead 57 again derives an error signal from the phase lock loop 51 ahead of the loop filter 54, as described above. The amplifier 58 amplifies this derived error signal. As the embodiment of FIG. 5, the apparatus of FIG. 6 has adjustable gain and flutter frequency roll off controls 59 for adapting the flutter enhancer to the stabilizer in the television set. The amplified and adjusted error signal is applied to the loop 72 after the loop filter 76. In particular, the lead 63 applies this amplified and adjusted error signal to the input of the voltage controlled oscillator 78. This allows a modulation of the phase of synchronizing signals without drift of the voltage controlled oscillator.

In consequence, the output signal of the voltage controlled oscillator 78 constitutes a synchronizing signal with enhanced flutter. A lead 81 applies this synchronizing signal to the mixer 38 which provides at an output 39 a composite video signal having picture signals and synchronizing signals, with the flutter of the synchronizing signals being substantially enhanced relative to the flutter of the picture signals. This composite video signal may then be applied to the television set 14 in one of the above mentioned ways for a display thereof by the picture tube 20.

Considerable flutter frequency enhancements are readily possible with the apparatus of FIG. 6, since the error signal is derived from the loop 51 ahead of the loop filter and is injected into the loop 72 after the loop filter.

In the course of practical tests, large flutter amplitudes have been simulated in composite video signals and have been applied to various television sets. The resulting picture displays were seriously distorted by large wavy disturbances. I then employed flutter enhancers according to my subject invention for enhancing the flutter of the synchronization signals still further without, however, enhancing the flutter of the accompanying picture signals. The result was very dramatic as even large wavy disturbances disappeared completely, indicating a very satisfactory correction of undesirable flutter effects.

It is thus now possible to employ linear or transverse scan or slant track video recording and playback equipment that, in terms of flutter, would at best have been considered mediocre by former standards, and to use even older television sets for displaying the played-back video programs. If desired, my present system may be combined with one of the conventional color correction systems in which the effects of flutter on the rendition of colors are electronically corrected.

By way of inventive refinement, FIG. 6 shows a frequency divider 100 connected between the input terminal 73 of the phase lock loop 72 and one input of the phase comparator 75, as shown in FIG. 6. A similar frequency divider 101 is connected in the feedback path between the output of the VCO 78 and the other input of the phase comparator 75.

In the illustrated preferred embodiment, the frequency dividers permit an increase of the range of the output of the VCO 78 over the normal limit, with the modulation being done at a lower frequency within the loop.

Moreover, in accordance with a preferred embodiment of the subject invention, the divisor, $d$, of the frequency diviers 100 and 101 is preferably equal to $$d = 7n + (n-1) \tag{15}$$

wherein $n$ is a positive integer greater than zero.

In practice, this introduces a phase shift, $\phi$, equal to $$\Phi' = \frac{\pi}{4}[7n + (n-1)] \tag{16}$$

into the flutter enhanced sync signal. This adds itself to the normal 90° phase shift of the loop 71 to provide a total phase shift, $\phi$, equal to $$\Phi = \frac{\pi}{4}[7n + (n-1)] + \frac{\pi}{4} \quad (17)$$

or $$\phi = 2\pi n \quad (18)$$

in the flutter enhanced sync signal applied to the video set 14.

Accordingly, the frequency dividers 100 and 101 not only increase the operating range of the flutter enhancer, but also automatically correct phase shift introduced by the flutter enhancer so that the lateral position of the video display is unaffected by the flutter enhancement operation.

Figure 7:
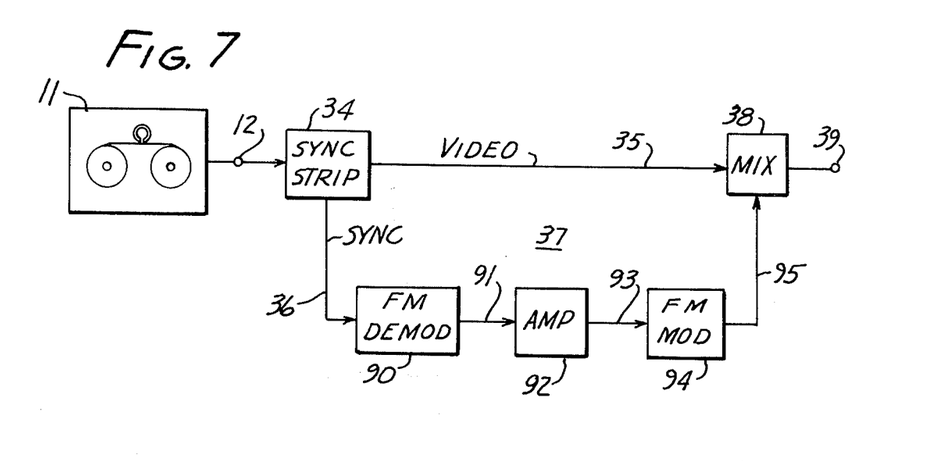
FIG. 7 is a block diagram of a synchronization signal flutter enhancer in accordance with yet another preferred embodiment of the subject invention, that may be employed in the system of FIG. 1.

A further type of flutter enhancer 37 is shown in FIG. 7. Like reference numerals as among FIGS. 1 and 7 designate like or functionally equivalent parts, and it is understood that the flutter enhancer and other equipment shown in FIG. 7 may be employed in the system of FIG. 1.

The flutter enhancer of FIG. 7 includes a means, such as a conventional type of FM demodulator 90 for detecting the envelope of flutter received from the sync stripper 34 by way of the lead 36. This received flutter is, of course, the flutter contained in the signal played back by the video tape recorder 11. The detected envelope of the flutter appears at a lead 91 and is amplified by a conventional amplifier 92.

The amplified detected envelope signal is applied via a lead 93 to an FM modulator 94 which in a conventional manner generates an enhanced FM modulation of the sync signal at a lead 95. The lead 95, in turn, applies the synchronization signal with enhanced flutter to the mixer 38 for the generation of a composite video signal, comprising the video or picture information received through the lead 35 and the synchronization signal with enhanced flutter applied via the lead 95. The output 39 of the mixer 38 may be connected in the manner shown in FIG. 1.

FIG. 7 is not only specific as to the embodiment just discussed, but it is also generic as to that embodiment and as to embodiments disclosed in other figures. In one of my experiments, I have used a pulse counting discriminator as the illustrated FM demodulator. Other examples of the block 90 include the previously disclosed phase lock loop 51 in FIGS. 5 or 6.

Different types of FM modulators 94 are suitable for the purposes of the subject invention. In addition, I have shown in FIG. 5 a voltage variable delay 62 which performs a similar function. Moreover, a monostable multivibrator with voltage controlled delay may be employed instead of a variable delay line. Moreover, the further phase lock loop 72 may be employed as FM modulator 94 in which case the FM modulator is a voltage controlled oscillator with a phase lock loop to maintain the center frequency with respect to a reference associated with the video signal.

By way of modification, it should be understood that the input terminal 73 of the second loop 72 could be disconnected from the output of the voltage controlled oscillator 55 and could be directly connected to the output terminal 52 of the sync stripper 34 so that the flutter in the sync signal provided at the terminal 52 acts as a reference for the second loop 72.

Figure 8:
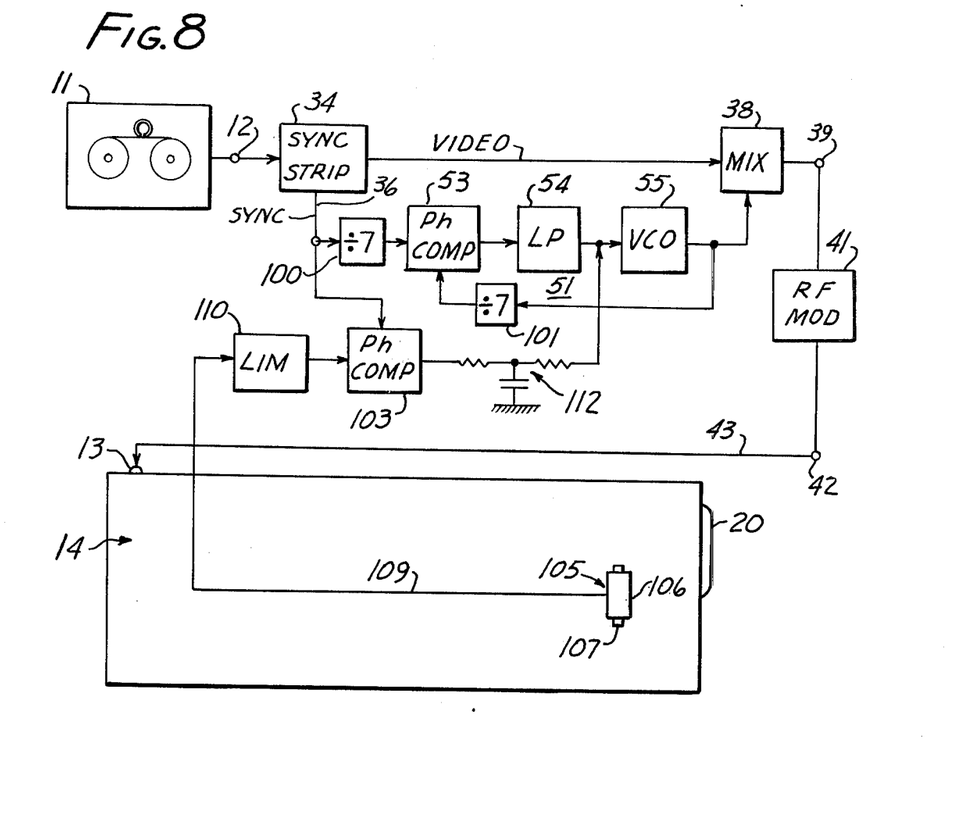
FIG. 8 is a block diagram of a synchronization signal flutter control in accordance with another preferred embodiment of the subject invention.

The preferred embodiment shown in FIG. 8 is capable of correcting relatively slow flutter, such as found in the operation of some medium priced rotating head machines, as well as the more rapid flutter found in the operation of linear machines. To this end, the embodiment of FIG. 8 utilizes in a novel manner the phase lock loop of the video display set, that is the above mentioned means for stabilizing received synchronizing signals against flutter, to produce an error signal which serves to modulate the played-back or received synchronizing signal so that the video display synchronization signals are affected by the same flutter as the corresponding picture elements.

More specifically, the above mentioned video tape recording and playback machine 11 applies electrical video information, including picture signals and picture synchronizing signals affected by flutter, via terminal 12 to the sync stripper 34. The separated synchronizing signal is applied via a lead 36 to a first phase comparator 53 and to a second phase comparator 103.

In accordance with the preferred embodiment described above in connection with FIG. 6, the frequency divider 100 may be connected between the sync stripper 34 and the phase comparator 53, as shown in FIG. 8, to increase the operating range and to correct the phase shift of the equipment, as described above.

The first phase comparator 53 is part of a phase lock loop having a loop filter 54 connected to the output of the phase comparator 53 and a voltage controlled oscillator 55 having an input connected to the output of the loop filter 54 and having an output connected to the mixer 38 and to a second input of the phase comparator 53. If the frequency divider 100 is employed at the first input of the phase comparator 53, then the frequency divider 101 may be employed at the second input of this phase comparator.

The equipment shown in FIG. 8 also includes a device 105 for providing signals corresponding to the display synchronization signals with which the video display device is synchronized. For instance, the signal pickup device 105 may cooperate with the above mentioned conventional television receiver set 14 to pickup the horizontal synchronization with which the video display tube 20 is synchronized. In practice, the device 105 may comprise a coil 106 having a ferrite rod 107 located outside of the television set 14 near the location of the picture tube 20 in order to pickup the flyback of the electromagnetic electron beam deflecting equipment.

In practice, such an inductive pickup may also be realized at a certain distance from a television set. By way of alternative, the flyback signal may be picked up inductively from the power supply cord of the set, such as by means of a coupling transformer (not shown), or acoustically from the flyback transformer with the aid of a microphone (not shown) located adjacent the television set.

The signals corresponding to the display synchronization or flyback signals are applied via a lead 109 to a limiter 110 which renders these corresponding signals suitable for phase comparison with the played-back synchronizing signals. In this connection, it is known that a limiter normalizes the amplitude of, and structures, a received signal as a square wave train. The output of the limiter 110 is fed to the second input of the second phase comparator 103 for phase comparison with flutter affected, played-back synchronizing signals. The resulting error signals are applied via a filter 112 to the input of the VCO 55 for a modulation of the separated synchronizing signals.

The filter 112 may have a low-pass characteristic for filtering the carrier frequency from the output of the second phase comparator 103.

The mixer 38 recombines the separated picture signals and processed synchronizing signals to provide at a terminal 39 a new composite video signal which may be radio frequency modulated at 41 as described above and applied to the antenna terminals 13 of the television receiver set 14 via terminal 42 and lead 43.

In effect, the synchronizing signal processing means, including the phase lock loop 51 and the second phase comparator 103, essentially deactivate the stabilizing function of the synchronizing signals stabilizing equipment 25 of the television set (see FIG. 1). In the embodiment according to FIG. 8, this is accomplished by using the television set phase lock loop 25 in combination with the external phase lock loop 51 of the signal processing equipment in a feedback type of arrangement.

Modifications and variations within the spirit and scope of the subject invention will become apparent to those skilled in the art from the present extensive disclosure.

I claim:
1. In apparatus for providing visible video information, the improvement comprising in combination:
    means for providing electrical video information including picture signals and picture synchronizing signals affected by flutter;
    means for processing said synchronizing signals, said processing means including means for stabilizing synchronizing signals against at least part of said flutter, said stabilizing means including filter means for attenuating signals having flutter frequencies above a predetermined frequency;
    means connected to said video information providing means and to said synchronizing signal processing means for displaying video information contained in said picture signals, said displaying means including means for synchronizing said video information with said processed synchronizing signals; and
    means connected between said video information providing means and said synchronizing signal processing means for compensating the stabilizing function of said stabilizing means, said compensating means including means for enhancing the flutter amplitude of synchronizing signals having said flutter frequencies substantially inversely proportional to said attenuation, and means for applying said synchronizing signals with said enhanced flutter amplitude to said processing means, whereby said synchronizing means in said displaying means synchronize said video information with synchronizing signals affected by essentially the same flutter as said picture signals.

2. An apparatus as claimed in claim 1, wherein:
    said stabilizing means in said processing means include a phase comparator having a first input for receiving said synchronizing signals, a second input, and an output connected to said filter means, and voltage controlled oscillator means having an input connected to said filter means and having an output connected to said second input of said phase comparator.

3. An apparatus as claimed in claim 1, wherein:
    said compensating means include means for generating an error signal in response to said flutter affecting said signals, means connected to said error signal generating means for providing in response to said error signal enhanced flutter in said synchronizing signals, and means for applying said synchronizing signals with said enhanced flutter to said processing means.

4. An apparatus as claimed in claim 3, wherein:
    said error signal generating means include a phase comparator having a first input for receiving said synchronizing signals, a second input, and an output, filter means connected to said output for attenuating output signals of said phase comparator having flutter frequencies above a predetermined frequency, voltage controlled oscillator means having an input connected to said filter means and having an output connected to said second input of said phase comparator, and means connected to said phase comparator output for deriving said error signal.

5. An apparatus as claimed in claim 4, wherein:
    said enhanced flutter providing means include variable delay means for receiving said synchronizing signals affected by flutter, and means for controlling said variable delay means in response to said error signal.

6. An apparatus as claimed in claim 1, wherein:
    said compensating means include a first phase comparator having a first input for receiving said synchronizing signals, a second input, and an output, first filter means connected to said output of the first phase comparator for attenuating output signals of said first phase comparator having flutter frequencies above a predetermined frequency, first voltage controlled oscillator means having an input connected to said first filter means, and having an output connected to said second input of said first phase comparator, means connected to said output of the first filter means for deriving an error signal, a second phase comparator having a first input connected to said output of said first voltage controlled oscillator, a second input, and an output, second filter means connected to said output of the second phase comparator for attenuating output signals of said second phase comparator having flutter components above a predetermined frequency, second voltage controlled oscillator means having an input connected to said second filter means and to said error signal deriving means, and having an output connected to said second input of said second phase comparator, and means connected to said output of said second voltage controlled oscillator for applying the output signal of said second voltage controlled oscillator to said synchronizing signal processing means.

7. An apparatus as claimed in claim 1, wherein:
    said compensating means include phase lock loop means having input means for receiving said flutter-affected synchronizing signals provided by said video information providing means, loop filter means, and output means for extracting ahead of said loop filter means an error signal in response to said flutter affecting said signals, means connected to said output means for providing in response to said error signal enhanced flutter in said synchronizing signals, and means for applying said synchronizing signals with said enhanced flutter to said processing means.

8. An apparatus as claimed in claim 7, wherein:

said enhanced flutter providing means include variable delay means for receiving said synchronizing signals affected by flutter, and means for controlling said variable delay means in response to said error signal.

9. An apparatus as claimed in claim 1, wherein:
said compensating means include first phase lock loop means having input means for receiving said flutter-affected synchronization signals provided by said video information providing means, first loop filter means, and output means, second phase lock loop means having input means connected to said output means of said first phase lock loop means, second loop filter means, and output means, means connected between said first and second phase lock loop means for deriving an error signal from said first phase lock loop means ahead of said first loop filter means and applying said derived error signal to said second phase lock loop means after said second loop filter means, and means for deriving synchronizing signals with enhanced flutter from said output means of said second phase lock loop means and applying said derived synchronizing signals with said enhanced flutter to said processing means.

10. In apparatus as claimed in claim 1, wherein:
said compensating means include means connected to said video information providing means for detecting the envelope of flutter affecting said synchronizing signals, means connected to said detecting means for providing enhanced flutter in said synchronizing signal corresponding to said detected envelope, and means connected to said enhanced flutter providing means for applying said synchronizing signal with enhanced flutter to said processing means.

11. In apparatus for providing electrical video signals including picture signals and picture synchronizing signals for video display apparatus having input means for receiving a composite video signal including picture signals and picture synchronizing signals, means for stabilizing received synchronizing signals at least partially against flutter, and means for synchronizing a display of received picture signals with received synchronizing signals, the improvement comprising in combination:
means for providing electrical video information including picture signals and picture synchronizing signals affected by flutter;
means connected to said video information providing means for separating said picture signals and synchronizing signals from each other;
means for processing said synchronizing signals including means for essentially deactivating the stabilizing function of said synchronizing signal stabilizing means in said video display apparatus;
means connected to said separating means and to said processing means for providing a composite video signal including said picture signals and said processed synchronizing signals; and
means connected between said composite video signal providing means and said input means for applying said provided composite video signal to said input means of said video display apparatus.

12. An apparatus as claimed in claim 11, wherein:
said input means of said video display apparatus include means for receiving a carrier-modulated composite video signal; and
said video signal applying means including means for modulating said provided composite video signal on a carrier.

13. An apparatus as claimed in claim 11, wherein:
said deactivating means include means for enhancing flutter in said separated synchronizing signals; and
said composite video signal providing means include means for providing a composite video signal including said picture signals and said processed synchronizing signals having said enhanced flutter.

14. An apparatus as claimed in claim 11, wherein:
said stabilizing means in said video display apparatus include filter means for attenuating signals having flutter frequencies above a predetermined frequency;
said deactivating means include means for enhancing the flutter amplitude of synchronizing signals having said flutter frequencies substantially inversely proportional to said attenuation; and
said composite video signal providing means include means for providing a composite video signal including said picture signals and said processed synchronizing signals having said enhanced flutter amplitudes.

15. An apparatus as claimed in claim 11, wherein:
said deactivating means include means for generating an error signal in response to said flutter affecting said signals, means connected to said error signal generating means for providing in response to said error signal enhanced flutter in said synchronizing signals; and
said composite video signal providing means include means for providing a composite video signal including said picture signals and said processed synchronizing signals having said enhanced flutter.

16. An apparatus as claimed in claim 11, wherein:
said error signal generating means include a phase comparator having a first input for receiving said synchronizing signals, a second input, and an output, filter means connected to said output for attenuating output signals of said phase comparator having flutter frequencies above a predetermined frequency, voltage controlled oscillator means having an input connected to said filter means and having an output connected to said second input of said phase comparator, and means connected to said phase comparator output for deriving said error signal.

17. An apparatus as claimed in claim 16, wherein:
said enhanced flutter providing means include variable delay means for receiving said synchronizing signals affected by flutter, and means for controlling said variable delay means in response to said error signal.

18. An apparatus as claimed in claim 11, wherein:
said deactivating means include a first phase comparator having a first input for receiving said synchronizing signals, a second input, and an output, first filter means connected to said output of the first phase comparator for attenuating output signals of said first phase comparator having flutter frequencies above a predetermined frequency, first voltage controlled oscillator means having an input connected to said first filter means, and having an output connected to said second input of said first phase comparator, means connected to said output of the first phase comparator for deriving an error signal, a second phase comparator having a first input connected to said output of said first voltage controlled oscillator, a second input, and an output, second filter means connected to said output of the second phase comparator for attenuating output signals of said second phase comparator having flutter components above a predetermined frequency, second voltage controlled oscillator means having an input connected to said second filter means and to said error signal deriving means, and having an output connected to said second input of said second phase comparator, and means connected to said output of said second voltage controlled oscillator for deriving a processed synchronizing signal having said enhanced flutter; and said composite video signal providing means include means for providing a composite video signal including said picture signals and said processed synchronizing signals having said enhanced flutter.

19. An apparatus as claimed in claim 11, wherein:
said deactivating means include phase lock loop means having input means for receiving said flutter-affected synchronizing signals provided by said video information providing means, loop filter means, and output means for extracting ahead of said loop filter means an error signal in response to said flutter affecting said signals, means connected to said output means for providing in response to said error signal enhanced flutter in said synchronizing signals; and
said composite video signal providing means include means for providing a composite video signal including said picture signals and said processed synchronizing signals having said enhanced flutter.

20. An apparatus as claimed in claim 11, wherein:
said enhanced flutter providing means include variable delay means for receiving said synchronizing signals affected by flutter, and means for controlling said variable delay means in response to said error signal.

21. An apparatus as claimed in claim 11, wherein:
said deactivating means include first phase lock loop means having input means for receiving said flutter-affected synchronization signals provided by said video information providing means, first loop filter means, and output means, second phase lock loop means having input means connected to said output means of said first phase lock loop means, second loop filter means, and output means, means connected between said first and second phase lock loop means for deriving an error signal from said first phase lock loop means ahead of said first loop filter means and applying said derived error signal to said second phase lock loop means after said second loop filter means, and means for deriving synchronizing signals with enhanced flutter from said output means of said second phase lock loop means; and
said composite video signal providing means include means for providing a composite video signal including said picture signals and said processed synchronizing signals having said enhanced flutter.

22. An apparatus as claimed in claim 11, wherein:
said deactivating means include means for detecting the envelope of flutter affecting said synchronizing signals, means connected to said detecting means for providing enhanced flutter in said synchronizing signals, and means connected to said enhanced flutter providing means for applying said synchronizing signals with said enhanced flutter to said composite video signal providing means as said processed synchronizing signal.

23. In apparatus for enhancing flutter in an electrical signal affected by flutter, the improvement comprising in combination:
first phase lock loop means having input means for receiving said flutter-affected signal, first loop filter means, and output means;
second phase lock loop means having input means connected to said output means of the first phase lock loop means, second loop filter means, and output means;
means connected between said first and second said lock loop means for deriving an error signal from sid first phase lock loop means ahead of said first loop filter means and applying said derived error signal to said second phase lock loop means after said second loop filter means; and
means for deriving an output signal with enhanced flutter from said output means of the second phase lock loop means.

24. An apparatus as claimed in claim 23, wherein:
said first phase lock loop means include a first phase comparator having a first input for receiving said flutter-affected signal, a second input, and an output, first filter means connected to said output of the first phase comparator for attenuating output signals of the first phase comparator having flutter frequencies above a predetermined frequency and first voltage controlled oscillator means having an input connected to said first fliter means, and having an output connected to said second input of the first phase comparator;
said second phase lock loop means include a second phase comparator having a first input connected to said output of the first voltage controlled oscillator, a second input, and an output, second filter means connected to the output of the second phase comparator for attenuating output signals of the second phase comparator having flutter components above a predetermined frequency, second voltage controlled oscillator means having an input connected to said second filter means, and having an input connected to said second filter means, and having an output connected to said second input of the second phase comparator;
said error signal deriving means include means connected to said output of the first phase comparator for deriving said error signal, and means connected to said input of the second voltage controlled oscillator means for applying the latter derived error signal to said second voltage controlled oscillator means; and
said output signal deriving means include means connected to said output of the second voltage controlled oscillator means for deriving an output signal with enhanced flutter.

25. In a method of improving the display of video information contained in picture signals affected by flutter and synchronized by synchronizing signals subjected to processing by means for stabilizing synchronizing signals against at least part of said flutter, the improvement comprising the steps of:
compensating said stabilizing function to preserve flutter in said synchronizing signals; and synchronizing said video signals for said display of vidoe information by synchronizing signals affected by essentially the same flutter as said picture signals;

said stabilization of synchronizing signals including attenuation of signals having flutter frequencies above a predetermined frequency; and said compensation of said stabilizing function including the step of enhancing the flutter amplitude of said synchronizing signals having said flutter frequencies substantially inversely proportional to said attenuation.

26. A method as claimed in claim 25, wherein:
said compensation of said stabilizing function includes the step of enhancing the flutter in said synchronizing signal ahead of said synchronizing signal processing.

27. A method as claimed in claim 25, wherein:
said compensation of said stabilizing function includes the steps of detecting the envelope of flutter affecting said video information, and of employing said detected envelope for providing enhanced flutter in said synchronizing signal ahead of said synchronizing signal processing.

28. In apparatus for providing electrical video signals including picture signals and picture synchronizing signals for video display apparatus having input means for receiving a composite video signal including picture signals and picture synchronizing signals, means for stabilizing received synchronizing signals at least partially against flutter, and means for synchronizing a display of received picture signals with received synchronizing signals, the improvement comprising in combination:

means for providing electrical video information including picture signals and picture synchronizing signals affected by flutter;

means connected to said video information providing means for separating said picture signals and synchronizing signals from each other;

means for processing said synchronizing signals including means for essentially deactivating the stabilizing function of said synchronizing signal stabilizing means in said video display apparatus and for shifting the phase of at least part of said flutter affected picture synchronizing signals by $$2\pi n$$

wherein $n$ is a positive integer greater than zero;

means connected to said separating means and to said processing means for providing a composite video signal including said picture signals and said processed synchronizing signals; and means connected between said composite video signal providing means and said input means for applying said provided composite video signal to said input means of said video display apparatus.

29. Apparatus as claimed in claim 28, wherein:
said processing means include means for enhancing flutter in said separated synchronization signals and means for shifting the phase of said separated, flutter enhanced synchronization signals by said $2\pi n$.

30. Apparatus as claimed in claim 28, wherein:
said deactivating means include a first phase comparator having a first input for receiving said synchronizing signals, a second input, and an output, first filter means connected to said output of the first phase comparator for attenuating output signals of said first phase comparator having flutter frequencies above a predetermined frequency, first voltage controlled oscillator means having an input connected to said first filter means, and having an output connected to said second input of said first phase comparator, means connected to said output of the first phase comparator for deriving an error signal, first frequency divider means having an input connected to said output of the first voltage controlled oscillator and having an output, a second phase comparator having a first input connected to said output of said first frequency divider means, a second input, and an output, second filter means connected to said output of the second phase comparator for attenuating output signals of said second phase comparator having flutter components above a predetermined frequency, second voltage controlled oscillator means having an input connected to said second filter means and to said error signal deriving means, and having an output, second frequency divider means having an input connected to said output of the second voltage controlled oscillator means and an output connected to said second input of said second phase comparator, and means connected to said output of said second voltage controlled oscillator for deriving a processed synchronizing signal having said enhanced flutter; and said composite video signal providing means include means for providing a composite video signal including said picture signals and said processed synchronizing signals having said enhanced flutter.

31. Apparatus as claimed in claim 30, wherein:
each of said first and second frequency divider means includes means for dividing the frequency of an applied signal by a divisor, $d$, equal to $$d = 7n + (-1)$$

wherein $n$ is a positive integer greater than zero.

32. In apparatus for providing electrical video signals including picture signals and picture synchronizing signals for video display apparatus having input means for receiving a composite video signal including picture signals and picture synchronizing signals, means for stabilizing received synchronizing signals at least partially against flutter, and means for synchronizing a display of received picture signals with display synchronization signals in response to received picture synchronizing signals, the improvement comprising in combination:

means coupled to said display synchronizing means for providing signals corresponding to said display synchronization signals;

means for providing electrical video information including picture signals and picture synchronizing signals affected by flutter;

means connected to said video information providing means for separating said picture signals and synchronizing signals from each other;

means connected to said separating means and to said corresponding signal providing means for providing error signals in response to said separated synchronizing signals and said corresponding signals;

means for processing said separated synchronizing signals with said error signals for essentially deactivating the stabilizing function of said synchronizing signal stabilizing means in said video display apparatus;

means connected to said separating means and to said processing means for providing a composite video signal including said picture signals and said processed synchronizing signals; and means connected between said composite video signal providing means and said input means for applying said provided composite video signal to said input means of said video display apparatus.

33. An apparatus as claimed in claim 32, wherein:
said processing means include means for modulating said separated synchronizing signals with said error signals.

34. An apparatus as claimed in claim 32, wherein:
said processing means include a first phase comparator having a first input connected to said separating means for receiving said separated synchronizing signals, a second input, and an output, filter means connected to said output of the first phase comparator for attenuating output signals of said first phase comparator having flutter frequencies above a predetermined frequency, voltage controlled oscillator means having an input connected to said means, and having an output connected to said second input of said first phase comparator;

said error signal providing means include a second phase comparator having a first input connected to said separating means, a second input connected to said corresponding signals providing means, and an output, and means for connecting said output of the second phase comparator to said input of said voltage controlled oscillator means.

35. An apparatus as claimed in claim 34, wherein:
said means for connecting said output of the second phase comparator to said input of said voltage controlled oscillator means include means for filtering a carrier frequency from the output of said second phase comparator.

36. Apparatus as claimed in claim 34, wherein:
said processing means include means for shifting the phase of said separated synchronizing signals by $$2\pi n$$

wherein $n$ is a positive integer greater than zero.

37. An apparatus as claimed in claim 32, wherein:
said processing means include first frequency divider means having an input connected to said separating means, and having an output, a first phase comparator having a first input connected to said output of the first frequency divider means, a second input, and an output, filter means connected to said output of the first phase comparator for attenuating output signals of said first phase comparator having flutter frequencies above a predetermined frequency, voltage controlled oscillator means having an input connected to said filter means, and having an output, second frequency divider means having an input connected to the output of said voltage controlled oscillator, and having an output connected to said second input of the first phase comparator;

said error signal providing means include a second phase comparator having a first input connected to said separating means, a second input connected to said corresponding signals providing means, and an output, and means for connecting said output of the second phase comparator to said input of said voltage controlled oscillator means.

38. An apparatus as claimed in claim 37, wherein:
said means for connecting said output of the second phase comparator to said input of said voltage controlled oscillator means include means for filtering a carrier frequency from the output of said second phase comparator.

39. An apparatus as claimed in claim 37, wherein:
each of said first and second frequency divider means includes means for dividing the frequency of an applied signal by a divisor, $d$, equal to $$d = 7n + (n-1)$$

wherein $n$ is a positive integer greater than zero.

* * * * *

UNITED STATES PATENT OFFICE
CERTIFICATE OF CORRECTION

PATENT NO. : 4,028,729
DATED : June 7, 1977
INVENTOR(S) : Lewis B. Browder

It is certified that error appears in the above-identified patent and that said Letters Patent are hereby corrected as shown below:

Column 20, line 15, (Claim 23, line 11), change "said" (second occurrence) to --phase--.

Column 20, line 17, (Claim 23, line 13), change "sid" to --said--.

Column 21, line 2, (Claim 25, line 10), change "vidoe" to --video--.

Column 22, line 38, (Claim 31, line 5), change "d = 7n+ (-1)" to --d = 7n+(n-1)--.

Signed and Sealed this

Fifteenth Day of May 1979

[SEAL]

Attest:

RUTH C. MASON
Attesting Officer

DONALD W. BANNER
Commissioner of Patents and Trademarks